United States Patent [19]

Usuki et al.

[11] Patent Number: 5,609,549
[45] Date of Patent: Mar. 11, 1997

[54] SPEED CHANGE CONTROL APPARATUS FOR AN AUTOMATIC TRANSMISSION

[75] Inventors: Katsutoshi Usuki, Kyoto; Kenjiro Fujita, Kusatsu; Katsuhiro Hatta, Uji, all of Japan

[73] Assignee: Mitsubishi Jidosha Kogyo Kabushiki Kaisha, Tokyo, Japan

[21] Appl. No.: 557,946

[22] Filed: Nov. 14, 1995

[30] Foreign Application Priority Data

Nov. 16, 1994 [JP] Japan .................................. 6-282031

[51] Int. Cl.$^6$ ...................................................... F16H 61/12
[52] U.S. Cl. ........................................... 477/125; 477/906
[58] Field of Search ..................................... 477/125, 906

[56] References Cited

U.S. PATENT DOCUMENTS

| | | | |
|---|---|---|---|
| 5,345,843 | 9/1994 | Fujita et al. | 477/98 |
| 5,366,424 | 11/1994 | Wataya | 477/906 |
| 5,370,016 | 12/1994 | Fujita et al. | 74/336 R |
| 5,435,796 | 7/1995 | Fujita et al. | 477/154 |
| 5,443,432 | 8/1995 | Fujita et al. | 477/155 |
| 5,445,577 | 8/1995 | Fujita et al. | 477/120 |
| 5,445,579 | 8/1995 | Fujita et al. | 477/156 |

Primary Examiner—Dirk Wright

[57] ABSTRACT

A speed change control apparatus of an automatic transmission has a transmission control unit. When determining a fault of a power-on/off determining section on the basis of engine load information from an engine control unit, the transmission control unit controls an oil pressure controller by regarding an engine as being in a power-on state in upshifting and by regarding the engine as being in a power-off state in downshifting. As a result, in either of upshifting and downshifting, the moment when a disengagement-side friction element of the transmission begins to slip and the moment when an engagement-side friction element is engaged are made proper. This makes it possible to surely prevent undesired rise in the engine rotation during the speed change in upshifting and inability in speed change in downshifting, which are caused by a fault of the power-on/off determining section.

3 Claims, 7 Drawing Sheets

SPEED CHANGE CONTROL APPARATUS FOR AN AUTOMATIC TRANSMISSION

BACKGROUND OF THE INVENTION

1. Field of the Invention

The present invention relates to a speed change control apparatus for an automatic transmission.

2. Description of the Related Art

An automotive automatic transmission is generally equipped with a speed change mechanism which includes planetary gears comprised of power transmitting elements such as sun gears and planetary carriers, and which includes hydraulic friction-engaging elements such as hydraulic wet-type multiple disc clutches and hydraulic band brakes. Further, a line pressure generated by a hydraulic pump driven by a crankshaft of an internal combustion engine is used as a drive source for the hydraulic friction-engaging elements. The automatic transmission of this type controls the operating states of the friction-engaging elements by controlling the oil pressure supply to and discharge from the friction-engaging elements relating to speed change, whereby the engine torque transmission path in the planetary gear is changed to obtain a desired speed (gear ratio).

An electronic control type automatic transmission uses an electromagnetic oil pressure control valves (hereinafter called solenoid valves) to control the operating states of the hydraulic friction-engaging elements. Specifically, by controlling the on/off duty ratio of a respective solenoid valve concerned, the oil pressure supply to or discharge from an associated hydraulic friction-engaging element is controlled such that the friction-engaging element is engaged or disengaged. Further, by changing the hydraulic friction-engaging element to be engaged, that is, by engaging one of the hydraulic friction-engaging elements relating to speed change and by disengaging the other hydraulic friction-engaging element, a speed change is carried out while reducing a speed change shock upon engagement and disengagement of the friction-engaging elements.

For example, when downshifting is carried out from the fourth speed to the third speed, the friction element for establishing the fourth speed (the disengagement-side friction element) is disengaged, and the friction element for establishing the third speed (the engagement-side friction element) is engaged. By effecting the just-mentioned switching operation for the friction elements, the engine torque transmission path is changed, whereupon the downshifting operation is completed.

Generally, in the electronic control type automatic transmission, a gear position (target gear position) best suitable for the current vehicle speed and the current throttle valve opening degree is determined by referring to a shift map in which a gear position to be selected is represented as a function of the vehicle speed (the rotational speed of transfer drive gear) and the throttle valve opening degree. Based on the result of this determination, the upshift or downshift control is carried out as necessary. In either of the upshift control or the downshift control, the control is made such that the switching operation for the friction-engaging elements is completed at the moment when the rotational speed of the input shaft of the automatic transmission reaches a synchronous rotational speed for the target gear position. However, the synchronous rotational speed is higher than the rotational speed of input shaft before speed change in upshifting and lower in downshifting. For this reason, different control programs (control rules) are used for the upshift control and the downshift control.

When an accelerator pedal is depressed, the engine is in a so-called power-on state. On the other hand, when the accelerator pedal is not depressed, the engine is in a so-called power-off state. If the disengagement-side friction element is disengaged in the power-on state, the rotational speed of input shaft is increased. If the disengagement-side friction element is disengaged in the power-off state, the rotational speed of input shaft is decreased. In both of the upshift control and the downshift control, therefore, whether the engine is in the power-on state or the power-off state is determined, and a control program in accordance with the result of this determination is used. That is, different control programs are used depending on whether the engine is in the power-on state or the power-off state.

As described above, the speed change control is carried out by using four kinds of control programs: programs for upshifting in the power-on state, for downshifting in the power-on state, for upshifting in the power-off state, and for downshifting in the power-off state.

More specifically, in the power-on downshift control, the disengagement-side friction element is disengaged to increase the rotational speed of input shaft up to the synchronous rotational speed. In the power-on upshift control, the disengagement-side friction element is disengaged and the engagement-side friction element is gradually engaged, to thereby decrease the rotational speed of input shaft down to the synchronous rotational speed. In the power-off upshift control, the disengagement-side friction element is disengaged to decrease the rotational speed of input shaft down to the synchronous rotational speed. Further, in the power-off downshift control, the disengagement friction element is disengaged and the engagement-side friction element is gradually engaged to increase the rotational speed of input shaft up to the synchronous rotational speed. In any of the shift controls, when the rotational speed of input shaft coincides with the synchronous rotational speed, the engagement-side friction element is engaged completely.

A determination as to whether the engine is in the power-on state or the power-off state is made on the basis of the engine load information such as the intake air amount per one intake stroke (intake air amount information) A/N and the throttle opening degree $\theta_{TH}$. If a load information sensor is faulty or a communication line for transmitting the load information is broken, therefore, the power-on/off determination based on the load information cannot be made correctly. This causes a trouble such as undesired rise in the engine rotation during the speed change or inability in speed change.

For example, in upshifting, if it is judged that the engine is in the power-off state despite the fact that the engine is actually in the power-on state, the disengagement-side friction element is disengaged before the engagement-side friction element begins to be engaged, so that the speed change mechanism of automatic transmission turns neutral temporarily. As a result, an undesired rise in the engine rotation (a sudden increase in input shaft rotational speed) occurs, so that a great shock is caused when the engagement-side friction element is engaged, resulting in remarkably deteriorated speed change feeling. In downshifting, if it is judged that the engine is in the power-on state despite the fact that the engine is actually in the power-off state, the disengagement-side friction element is disengaged, so that the rotational speed of input shaft decreases gradually. Moreover, in the power-on downshift control, the engagement-side friction element is engaged after the rotational speed of input shaft has reached the synchronous rotational speed of the target gear position. Therefore, the rotational speed of input shaft cannot reach the synchronous rotational speed, so that the engagement of the engagement-side friction element and in turn the downshifting operation is not completed.

SUMMARY OF THE INVENTION

An object of the present invention is to provide a speed change control apparatus for an automatic transmission which is adapted to prevent an undesired rise in the engine rotation during the speed change and inability in speed change, which are caused by a fault of a power-on/off determining means of the speed change control apparatus operated in accordance with the control rule different between the case where an internal combustion engine is in a power-on state and the case where it is in a power-off state.

According to the present invention, there is provided a speed change control apparatus in which a determination is made by power-on/off determining means as to whether an internal combustion engine coupled to the automatic transmission is in a power-on state or in a power-off state and required one of upshift control and downshift control is executed in accordance with a control rule corresponding to a result of the determination made by the power-on/off determining means.

The speed change control apparatus of the present invention comprises fault diagnosing means for detecting the presence/absence of a fault of the power-on/off determining means. In case that the fault diagnosing means determines a fault of the power-on/off determining means, the control apparatus carries out a power-on upshift control by regarding the internal combustion engine as being in the power-on state, when upshifting is requested. The control apparatus carries out a power-off downshift control by regarding the internal combustion engine as being in the power-off state, when downshifting is requested.

The speed change control apparatus of the present invention is advantageous in that when the power-on/off determining means is faulty, power-on upshift control is carried out in accordance with the request for upshifting regardless of the determination result obtained by the power-on/off determining means. This makes it possible to surely prevent a sudden increase in the rotational speed of an input shaft of the automatic transmission, that is, an undesired rise in the engine rotation during the speed change. Thus, a speed change shock caused by the undesired rise in the engine rotation during the speed change can be prevented.

Another advantage of the present invention is that when the power-on/off determining means is faulty, power-off downshift control is carried out in accordance with the request for downshifting regardless of the determination result obtained by the power-on/off determining means. Thus, the progress of speed change action of the automatic transmission is encouraged, so that inability in speed change can be surely prevented.

Preferably, the speed change control apparatus of the present invention further includes a load information sensor for detecting the load of the internal combustion engine. The fault diagnosing means determines the presence/absence of a fault of the power-on/off determining means on the basis of an output from the load information sensor.

An advantage of the speed change control apparatus according to this preferred embodiment is that if load information is not obtained due to a fault of the load information sensor or breakage of a signal cable for transmitting load information or if a mismatch occurs between pieces of load information, a fault of the power-on/off determining means can surely be detected.

In the power-on upshift control, preferably, the speed change control apparatus operates a first hydraulically-operated friction element of the automatic transmission to be disengaged and operates a second hydraulically-operated friction element of the automatic transmission to be engaged, to thereby decrease the rotational speed of the input shaft of the automatic transmission down to a first synchronous rotational speed. In the power-off downshift control, the control apparatus operates the second hydraulically-operated friction element to be disengaged and the first hydraulically-operated friction element to be engaged, to thereby increase the rotational speed of the input shaft up to a second synchronous rotational speed.

The speed change control apparatus of this preferred embodiment is suitable especially to a transmission of a type which performs a speed change by switching the engagement/disengagement states of friction elements concerned.

DETAILED DESCRIPTION OF THE PREFERRED EMBODIMENTS

A speed change control apparatus according to one embodiment of the present invention, which is installed in an automotive automatic transmission, will be described in detail below.

Figure 1:
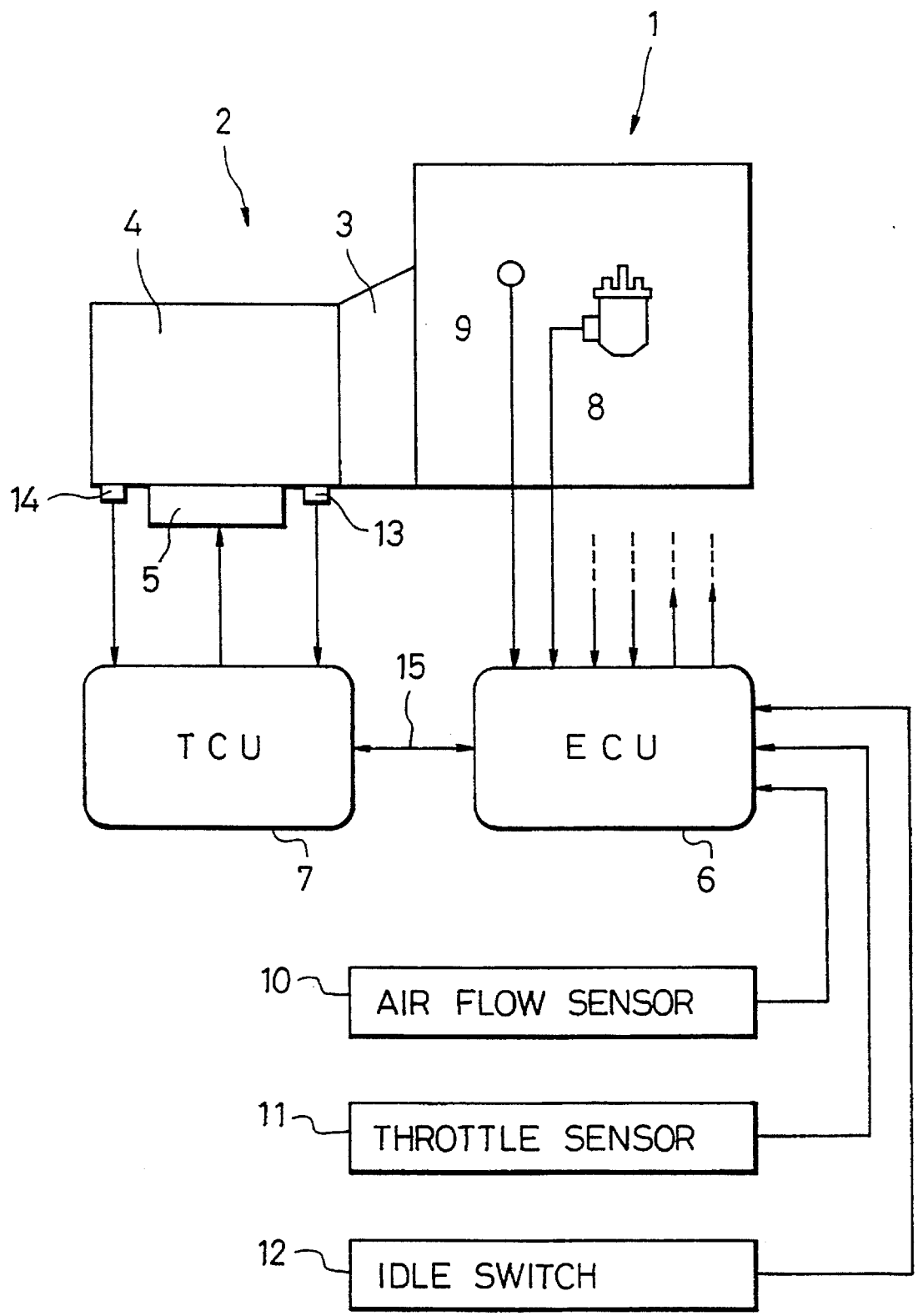
FIG. 1 is a schematic view showing a speed change control apparatus according to one embodiment of the present invention, together with peripheral elements thereof.

Referring now to FIG. 1, an automatic transmission 2 comprising a torque converter 3, a transmission 4, and an oil pressure controller 5 is drivingly coupled to a crankshaft (not shown) of an engine 1, so that the output of the engine 1 is transmitted to driving wheels (not shown) of an automobile via the automatic transmission 2.

The transmission 4 incorporates a plurality of planetary gears and hydraulic friction-engaging elements (hereinafter called friction elements) such as hydraulic clutches and hydraulic brakes.

Figure 2:
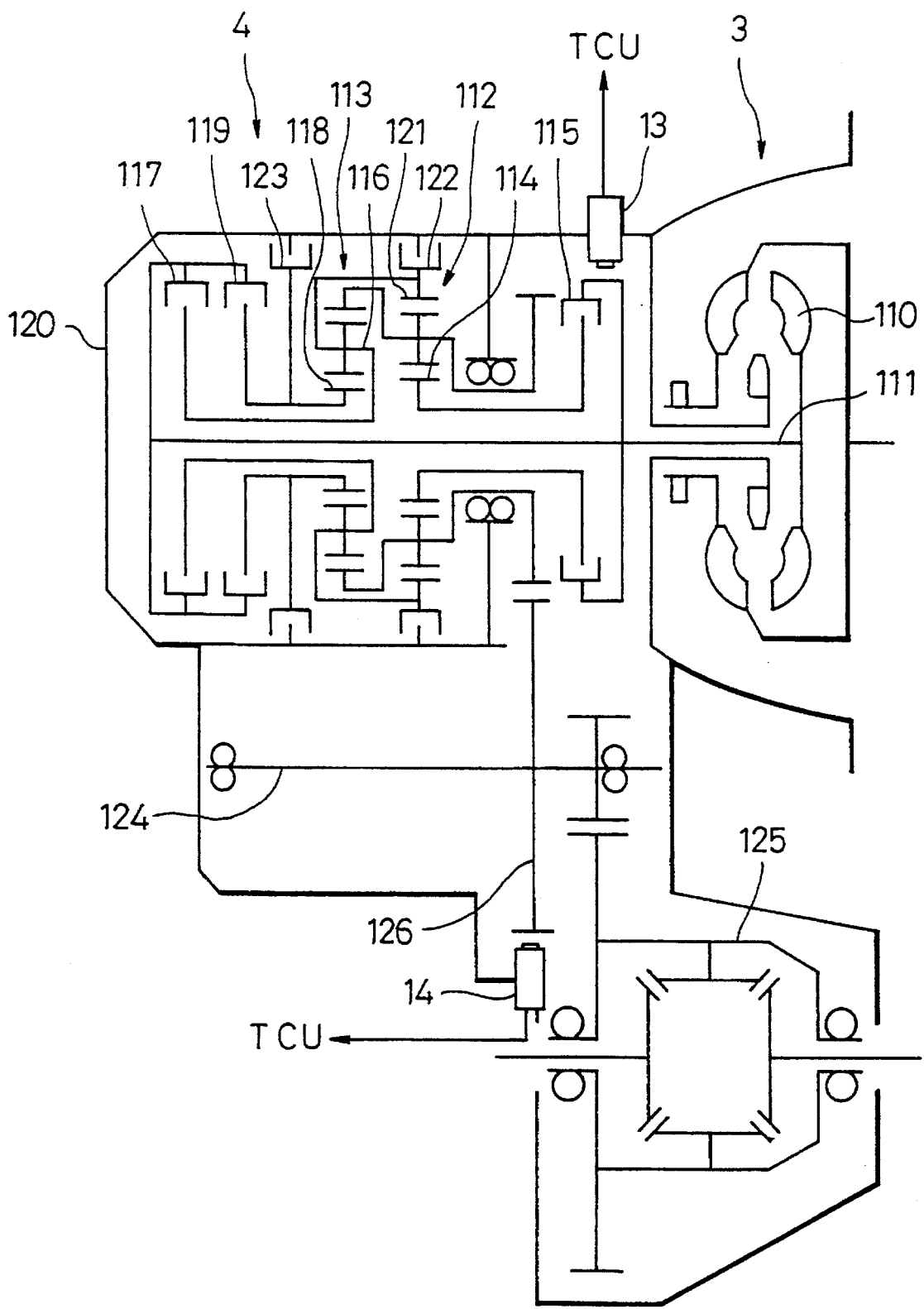
FIG. 2 is a detailed view of a transmission shown in FIG. 1.

Referring to FIG. 2, the transmission 4 has a first planetary gear 112, a second planetary gear 113, and an input shaft 111 connected to a turbine 110 of the torque converter 3 for rotation in unison therewith. To the input shaft 111 are drivingly connected the respective input sides of a first clutch 115, a second clutch 117, and a third clutch 119. When hydraulic fluid is supplied to an engagement piston (not shown) of each of the clutches 115, 117, and 119, the input and the output sides of the clutch are engaged with each other, and when the hydraulic fluid is discharged from the piston of the clutch, the input and output sides thereof are disengaged from each other. The respective output sides of the first, second, and third clutches 115, 117, and 119 are connected to a sun gear 114 of the first planetary gear 112, a pinion carrier 116 of the second planetary gear 113, and a sun gear 118 of the second planetary gear 113, respectively.

Accordingly, when the first clutch 115 is engaged, the sun gear 114 is drivingly connected to the input shaft 111. When the second clutch 117 is engaged, the pinion carrier 116 is connected to the input shaft 111. When the third clutch 119 is engaged, the sun gear 118 is connected to the input shaft 111.

A casing 120 of the transmission 4 is provided with a first brake 122 and a second brake 123 each including an engagement servo device (not shown). When hydraulic fluid is supplied to the servo device of the first brake 122, the first brake 122 is engaged and operates to fix an internal gear 121 of the first planetary gear 112 so that the internal gear 121 cannot rotate. When the hydraulic fluid is discharged from the servo device of the first brake 122, the internal gear 121 is allowed to rotate. Similarly, when hydraulic fluid is supplied to the servo device of the second brake 123, the sun gear 118 of the second planetary gear 113 is fixed, and when the hydraulic fluid is discharged, the sun gear 118 is allowed to rotate. The rotation of the input shaft 111 is transmitted to a counter shaft 124 via the planetary gears 112 and 113, and further transmitted from the counter gear 124 to a differential carrier 125. Reference numeral 126 denotes a driven gear.

In the automatic transmission 2 of this embodiment, the first to third clutches 115, 117, and 119 and the first and second brakes 122 and 123, which are the friction elements, are engaged or disengaged to establish any one of the first to fourth and reverse gears as shown in Table 1. In Table 1, the ○ mark indicates the engagement of the clutch or the brake.

TABLE 1

| | Friction-engaging element | | | | |
|---|---|---|---|---|---|
| Speed | 1st Clutch 115 | 2nd Clutch 117 | 2nd Brake 123 | 1st Brake 122 | 3rd Clutch 119 |
| 1st | ○ | | | ○ | |
| 2nd | ○ | | ○ | | |
| 3rd | ○ | ○ | | | |
| 4th | | ○ | ○ | | |
| RVS | | | | ○ | ○ |
| N, P | | | | ○ | |

The oil pressure controller 5 shown in FIG. 1A is formed with a hydraulic circuit, not shown. This hydraulic circuit is supplied with pressurized hydraulic fluid generated by a hydraulic pump (not shown) which is driven by the crankshaft of the engine 1. At various parts of the hydraulic circuit, various control valves (not shown) are disposed, these control valves including a plurality of solenoid valves which are subject to duty control carried out by a transmission control unit (TCU) 7. The various control valves are operated under the control of the TCU 7 to control the oil pressure supply to and discharge from the first to third clutches 115, 117 and 119 and the first and second brakes 122 and 123, to thereby establish an arbitrary one of the first to fourth and reverse gears of the transmission 4.

Reference numeral 6 denotes an engine control unit (ECU) for controlling the operation of the engine 1. Each of the ECU 6 and the TCU 7 includes input/output devices, memories (nonvolatile RAM, ROM, etc.), a central processing unit (CPU), timer counters and the like (none of which are illustrated). The ECU 6 and the TCU 7 are connected to each other by a signal cable 15 to exchange information mutually by means of serial communication.

Connected to the input side of the ECU 6 are: a crank angle sensor 8 for detecting the crank angle of a respective cylinder of the engine 1 and the rotational speed of engine $N_e$; a water temperature sensor 9 for detecting the cooling water temperature $T_W$; an air flow sensor 10 for detecting the intake air flow rate $Q_A$; a throttle sensor 11 for detecting the throttle opening degree $f_{TH}$; and an idle switch 12 for detecting the fully opened condition of the throttle valve. In addition, various sensors and switches are connected to the input side of the ECU 6.

Connected to the input side of the TCU 7 are an $N_T$ sensor 13 (refer to FIG. 2) for detecting the rotational speed of the turbine shaft in the torque converter 3 (the rotational speed of input shaft) $N_T$, and an $N_O$ sensor 14 (refer to FIG. 2) for detecting the rotational speed of transfer driven gear $N_O$ representing the vehicle speed V. Further, various sensors and switches (not shown) such as an inhibitor switch for detecting the gear position and an oil temperature sensor are connected to the input side of the TCU 7.

The ECU 6 carries out overall control of the engine including the control of fuel injection amount, ignition timing and the like on the basis of various input information. The TCU 7 carries out the speed change control of the automatic transmission 2 by driving the hydraulic friction elements in the transmission 4 via the oil pressure controller 5.

Next, the operation of the speed change control apparatus will be described.

Figure 3:
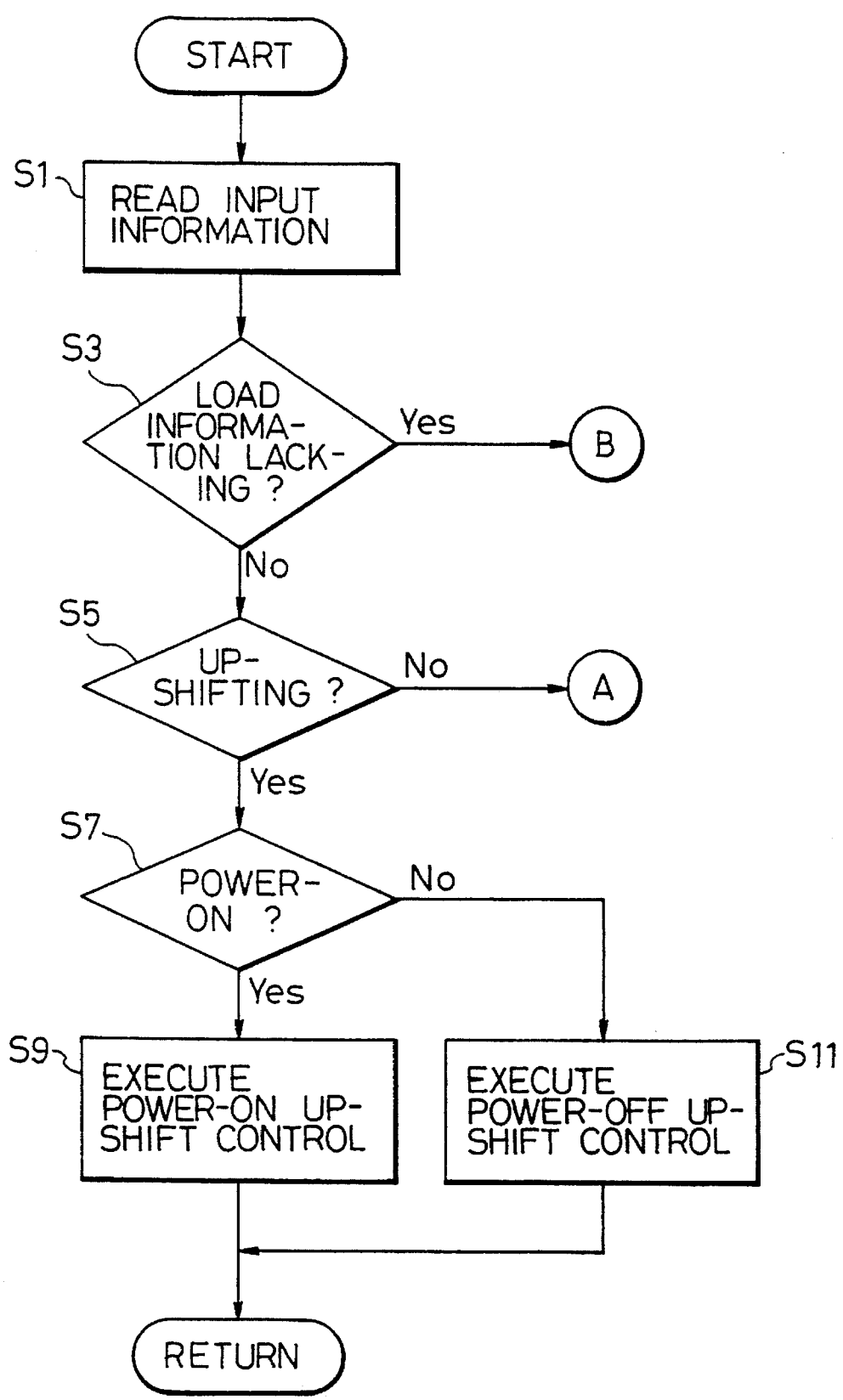
FIG. 3 is a flowchart showing a part of a speed change control subroutine carried out by a transmission control unit (TCU) shown in FIG. 1.
Figure 4:
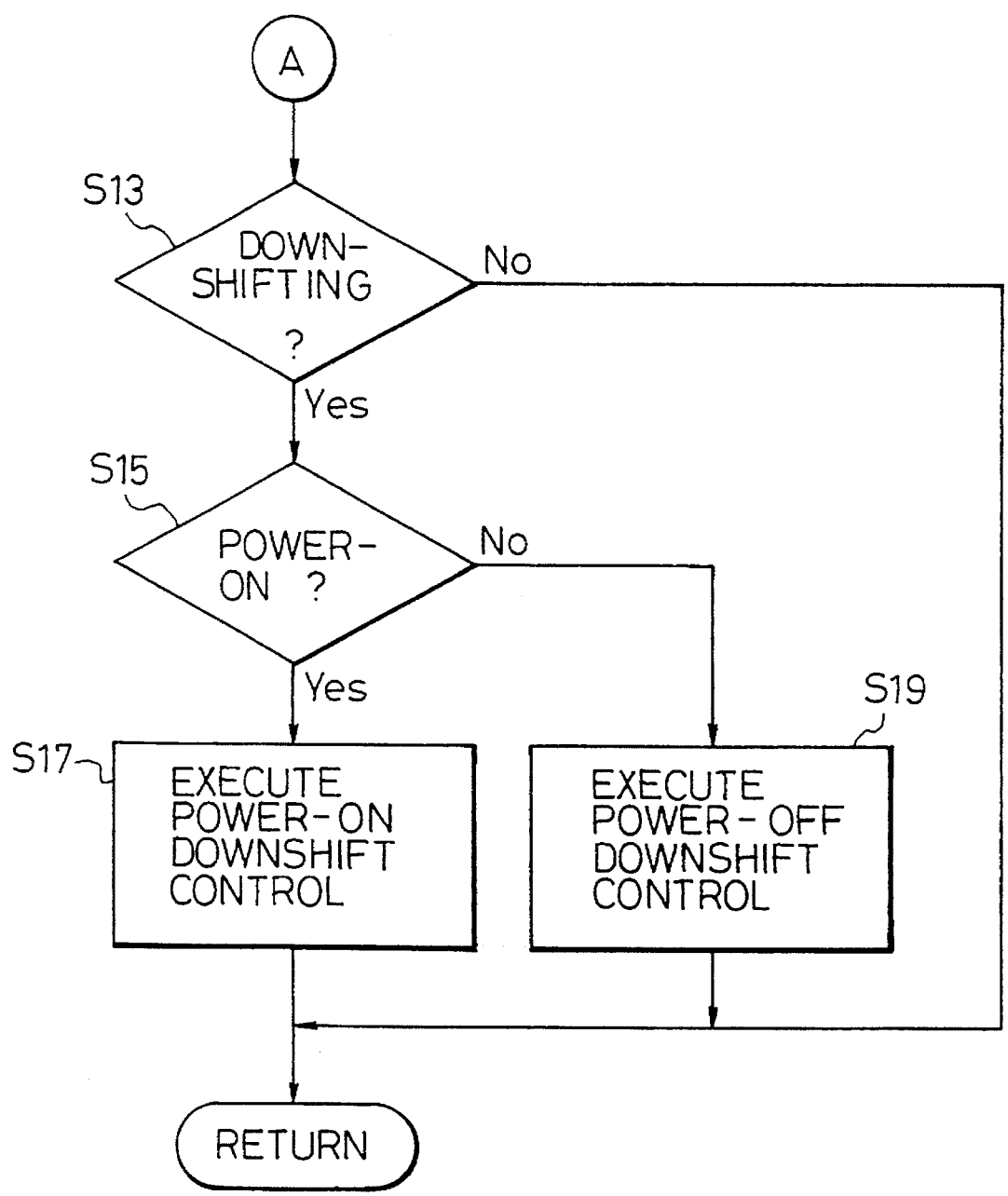
FIG. 4 is a flowchart showing another part of the speed change control subroutine following Step S5 in FIG. 3.
Figure 5:
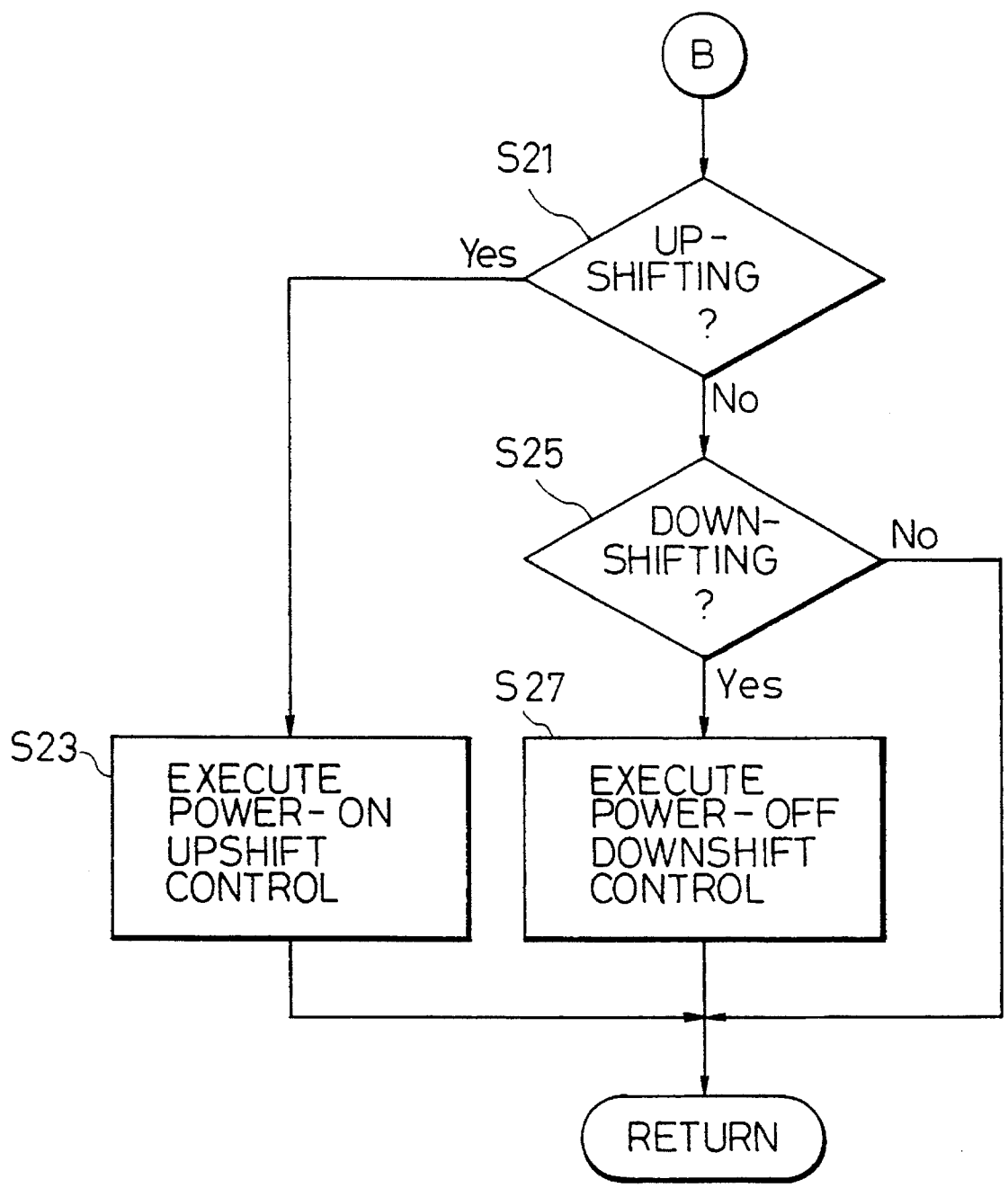
FIG. 5 is a flowchart showing still another part of the speed change control subroutine following Step S3 in FIG. 3.

When the engine 1 is started by the operator's turning-on operation of an ignition key, the TCU 7 starts the execution of the speed change control subroutine shown in FIGS. 3 to 5, and subsequently executes the subroutine repeatedly at predetermined time intervals.

In the speed change control subroutine, the TCU 7 first reads the input information from the aforementioned various sensors and the ECU 6, and stores it into the RAM in Step S1. In Step S3, the TCU 7 determines whether or not the load information on which a power-on/off determination is made is lacking. In this determination, for example, if the intake air amount information A/N or the like is not inputted at all by the breakage in the signal cable 15 or the like, or if the throttle sensor 10 outputs a detected value close to full opening despite the fact that the idle switch 12 is turned on, or if the throttle sensor 10 outputs a detected value close to full closing despite the fact that the idle switch 12 is turned off, it is judged that the load information is lacking, and thus the power-on/off determining means is faulty. That is, the TCU 7 functions as fault diagnosing means for detecting a fault of the power-on/off determining means.

Figure 6:
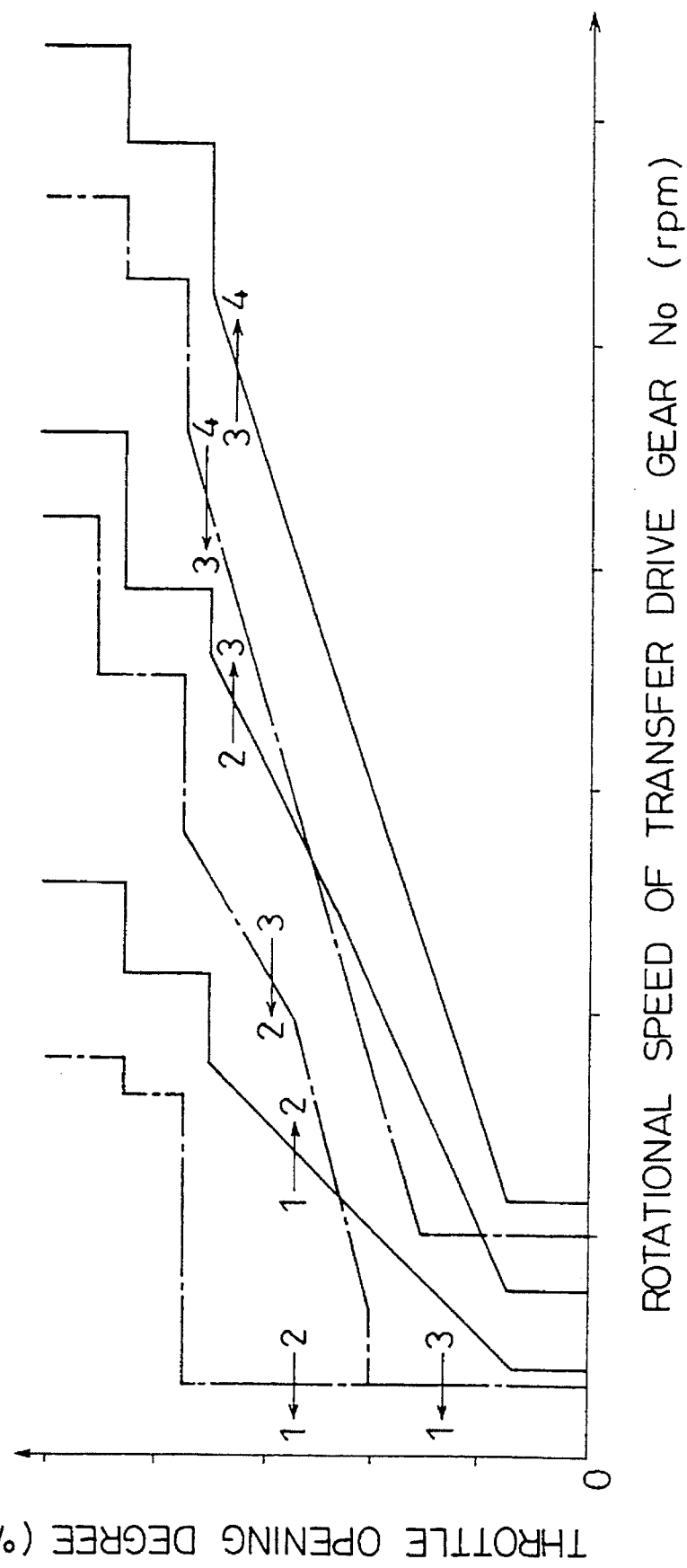
FIG. 6 is a shift map used for carrying out the speed change control subroutine.

If the determination result in Step S3 is No, that is, if the load information is normal and hence the power-on/off determining means is not faulty, the TCU 7 determines, in Step S5, whether or not upshifting is to be performed by determining a target gear position from the shift map shown, by way of example, in FIG. 6 on the basis of the current rotational speed of transfer drive gear $N_O$ and the current throttle opening degree $\theta_{TH}$ and by comparing the thus determined target gear position with the current gear position.

The upshift lines indicated by solid lines in FIG. 6 and the downshift lines indicated therein by dashed lines are defined as a function of rotational speed of transfer drive gear $N_O$, representing vehicle speed, and throttle opening degree $\theta_{TH}$. The respective upshift line is positioned on the higher speed side than the associated downshift line, so as to avoid undesired frequent speed change.

Figure 7:
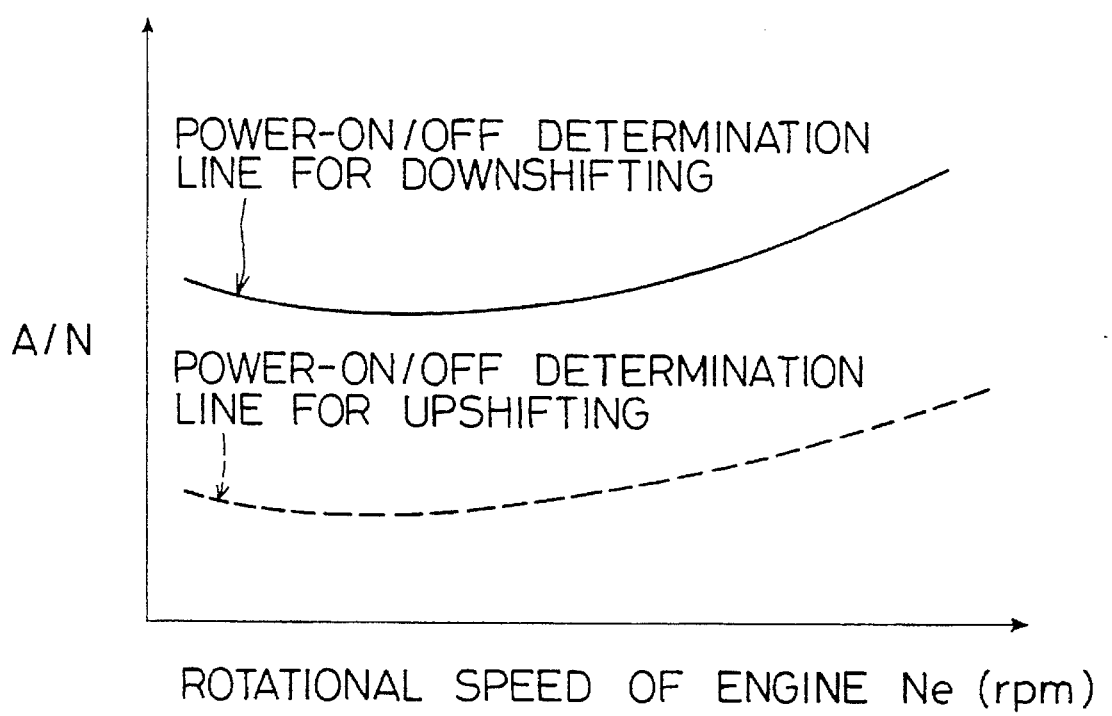
FIG. 7 is a map for power-on/off determination used for carrying out the speed change control subroutine.

If the determination result in Step S5 is Yes, that is, if upshifting is requested, the TCU 7 determines, in Step S7, whether or not the engine 1 is in the power-on state on the basis of the rotational speed of engine $N_e$ and the intake air amount information A/N from the ECU 6 by using the power-on/off determination map shown by way of example in FIG. 7. That is, the TCU 7 functions as power-on/off determining means for determining whether the engine is in the power-on state or in the power-off state.

The power-on/off determination line for downshifting indicated by the solid line in FIG. 7 and the power-on/off determination line for upshifting indicated therein by the dashed line are defined as a function of rotational speed of engine $N_e$ and intake air amount information A/N. The determination line for downshifting is positioned on the higher load side than the determination line for upshifting. As a result, in the load zone where the power-on/off state is ambiguous, between the determination line for downshifting and the determination line for upshifting, it is judged that the engine 1 is in the power-off state in downshifting, so that the downshifting is completed surely. In upshifting, it is judged that the engine 1 is in the power-on state, so that the undesired rise in the engine rotation during the speed change is prevented surely.

If the determination result in Step S7 is Yes, that is, if the current engine operating condition falls in the zone on the higher load side than the power-on/off determination line for upshifting, the power-on upshift control is executed in Step S9. On the other hand, if the determination result in Step S7 is No, the power-off upshift control is executed in Step S11.

In the power-on upshift control, the TCU 7 drives the solenoid valves for oil pressure control at proper duty cycles, so as to discharge hydraulic fluid from the disengagement-side friction element to thereby disengage the element, and supply hydraulic fluid at the maximum pressure to the engagement-side friction element to thereby rapidly perform so-called "dead space elimination". Here, the dead space elimination means an operation for eliminating a clearance provided between adjacent ones of many friction plates (not shown) of the engagement-side friction element, in a state where the engagement-side friction element is disengaged, to prevent the occurrence of drag torque therebetween. The discharge of hydraulic fluid from the disengagement-side friction element is achieved by the hydraulic fluid discharging action due to the return force of a return spring (not shown) of the disengagement-side friction element after the pressure supply to the element is stopped.

The discharge of hydraulic fluid from the disengagement-side friction element and the dead space elimination of the engagement-side friction element are executed such that the timing or moment when the disengagement-side friction element begins to slip coincides with the moment when the engagement-side friction element begins to be engaged. Preferably, the known learning control is carried out for the coincidence of timings.

Thereafter, the TCU 7 disengages the disengagement-side friction element completely, and controls the engagement of the engagement-side friction element in a feedback manner so that the rotational speed change rate of the input shaft 111 coincides with a target change rate, to thereby gradually decrease the input shaft rotational speed. At the moment when the rotational speed of the input shaft 111 coincides with the synchronous rotational speed for the target gear position, the engagement-side friction element is engaged at the maximum oil pressure, completing the power-on upshifting.

In the power-off upshift control, the TCU 7 drives the solenoid valves for oil pressure control at proper duty cycles, so as to discharge hydraulic fluid from the disengagement friction element to thereby completely disengage the disengagement-side friction element, and supply hydraulic fluid at the maximum pressure to the engagement-side friction element to thereby perform the dead space elimination. Until the rotational speed of the input shaft 111 reaches the synchronous rotational speed for the target gear position, the TCU 7 controls the oil pressure supply to the engagement-side friction element so that the engagement-side friction element waits at the position where the dead space elimination is completed. When the rotational speed of the input shaft 111 reaches the synchronous rotational speed, the TCU 7 supplies the maximum oil pressure to the engagement-side friction element again, to thereby completely engage the engagement-side friction element, completing the power-off upshifting.

If the determination result in Step S5 is No, that is, if upshifting is not requested, the TCU 7 determines, in Step S13, whether or not downshifting is to be carried out by comparing the current gear position with the target gear position.

If the determination result is No, that is, if downshifting is not requested, the execution of this subroutine in this control cycle is completed. The subroutine is executed again from Step S1 when a predetermined time interval has elapsed.

On the other hand, if the determination result in Step S13 is Yes, that is, if downshifting is requested, the TCU 7 determines, in Step S15, whether or not the engine operating state falls within the zone on the higher load side than the determination line for downshifting in FIG. 7 on the basis of the rotational speed of engine $N_e$ and the intake air amount information A/N from the ECU 6 by referring to the power-on/off determination map shown in FIG. 7, to thereby determine whether or not the engine 1 is in the power-on state. If the determination result is Yes, the power-on downshift control is executed in Step S17, and if the determination result is No, the power-off downshift control is executed in Step S19.

In the power-on downshift control, the TCU 7 drives the solenoid valves for oil pressure control at proper duty cycles, so as to discharge hydraulic fluid from the disengagement-side friction element to thereby completely disengage the disengagement-side friction element, and supply the maximum oil pressure to the engagement-side friction element to thereby perform the dead space elimination. Until the rotational speed of the input shaft 111 reaches the synchronous rotational speed for the target gear position, the TCU 7 controls the oil pressure supply to the engagement-side friction element so that the engagement-side friction element waits at the position where the dead space elimination is completed. When the rotational speed of the input shaft 111 reaches the synchronous rotational speed, the TCU 7 supplies the maximum oil pressure to the engagement-side friction element again to thereby completely engage the engagement-side friction element, completing the power-on downshifting.

In the power-off downshift control, the TCU 7 carries out the duty drive of the solenoid valve for oil pressure control, so as to discharge hydraulic fluid from the disengagement-side friction element to disengage the disengagement-side friction element, and perform the dead space elimination by supplying the maximum pressure to the engagement-side friction element. Meanwhile, as with the case of power-on upshift control, the learning control has been made beforehand such that the moment when the disengagement-side friction element begins to slip coincides with the moment when the engagement-side friction element begins to be engaged. Thereafter, the TCU 7 disengages the disengagement-side friction element completely, and carries out the feedback control of engagement of the engagement-side friction element so that the rotational speed change rate of the input shaft 111 coincides with the target change rate, to thereby gradually decrease the input shaft rotational speed. When the rotational speed of the input shaft 111 coincides with the synchronous rotational speed for the target gear position, the engagement-side friction element is engaged at the maximum oil pressure, completing the power-off downshifting.

If the load information is lacking and hence the determination result in Step S3 is Yes, the TCU 7 determines, in Step S21, whether or not upshifting is to be performed by determining a target gear position from the shift map shown in FIG. 6 on the basis of the current rotational speed of transfer drive gear $N_O$ and the current throttle opening degree $\theta_{TH}$ and by comparing the thus determined target gear position with the current gear position. If the determination result is Yes, the power-on upshift control is executed in Step S23.

In this power-on upshift control, the TCU 7 controls the discharge of hydraulic fluid from the disengagement friction element and the supply of hydraulic fluid to the engagement-side friction element so that the moment when the disengagement-side friction element begins to slip coincides with the moment when the engagement-side friction element begins to be engaged. Next, the TCU 7 disengages the disengagement-side friction element completely, and carries out feedback control of engagement of the engagement-side friction element so that the rotational speed change rate of the input shaft 111 coincides with the target change rate. At the time when the rotational speed of the input shaft 111 decreases down to the synchronous rotational speed for the target gear position, the TCU 7 engages the engagement-side friction element at the maximum oil pressure, completing the power-on upshifting. As a result, the upshifting is carried out without trouble naturally when the engine 1 is actually in the power-on state, and even when the engine 1 is actually in the power-off state.

If the determination result in Step S21 is No, that is, if upshifting is not requested, the TCU 7 determines, in Step S25, whether or not the downshifting is to be carried out by comparing the current gear position with the target gear position. If this determination result is No, that is, if downshifting is not requested, this subroutine in this control cycle is completed.

On the other hand, the determination result in Step S25 is Yes, that is, downshifting is requested, the TCU 7 executes the power-off downshift control in Step S27.

In this power-off downshift control, the TCU 7 controls the discharge of hydraulic fluid from the disengagement-side friction element and the supply of hydraulic fluid to the engagement-side friction element so that the moment when the disengagement-side friction element begins to slip coincides with the moment when the engagement-side friction element begins to be engaged. Then, the TCU 7 disengages the disengagement-side friction element completely, and carries out feedback control of engagement of the engagement-side friction element so that the rotational speed change rate of the input shaft 111 coincides with the target change rate. When the rotational speed of the input shaft 111 increases up to the synchronous rotational speed for the target gear position, the engagement-side friction element is engaged at the maximum oil pressure, completing the speed change. As a result, the downshifting is carried out without trouble naturally when the engine 1 is actually in the power-off state, and even when the engine 1 is actually in the power-on state.

As described above, according to the present embodiment, in a case where a fault of the power-on/off determining means is detected, the supply and discharge of hydraulic fluid to and from the hydraulic friction-engaging elements are carried out by regarding the engine as being in the power-on state upon execution of upshifting, and by regarding the engine as being in the power-off state upon execution of downshifting. This makes it possible to completely prevent undesired rise in the engine rotation during the speed change and inability in speed change, which are caused by a fault of the power-on/off determining means. Power-on upshifting or power-off downshifting, which is accomplished when a fault of the power-on/off determining means is detected, entails excessive speed change control. However, this does not cause a trouble such as improper speed change.

The present invention is not limited to the foregoing embodiment.

For instance, in the embodiment, the present invention has been applied to an automatic transmission of a type equipped with hydraulic friction-engaging elements. However, the present invention can be also applied to an automatic transmission equipped with electromagnetic engaging elements or the like. In the embodiment, the output value of the idle switch or the throttle sensor has been used as the load information in addition to the intake air amount information A/N. Alternatively, the change rate of throttle opening degree or the like may be used. Further, the specific procedure of control can be modified without departing from the spirit of the present invention.

What is claimed is:

1. A speed change control apparatus for an automatic transmission in which a determination is made by power-on/off determining means as to whether an internal combustion engine coupled to the automatic transmission is in a power-on state or in a power-off state and in which required one of upshift control and downshift control is executed in accordance with a control rule corresponding to a result of the determination made by the power-on/off determining means, comprising:

fault diagnosing means for determining the presence/absence of a fault of the power-on/off determining means; and wherein:
   in a case where said fault diagnosing means determines a fault of the power-on/off determining means, said control apparatus carries out a power-on upshift control by regarding the internal combustion engine as being in the power-on state when upshifting is requested, and carries out a power-off downshift control by regarding the internal combustion engine as being in the power-off state when downshifting is requested.

2. A speed change control apparatus according to claim 1, further including:

a load information sensor for detecting load of the internal combustion engine; and wherein:

said fault diagnosing means determines the presence/absence of a fault of the power-on/off determining means on the basis of an output from said load information sensor.

3. A speed change control apparatus according to claim 1, wherein:

in said power-on upshift control, said control apparatus operates a first hydraulically-operated friction element of the automatic transmission to be disengaged, and operates a second hydraulically-operated friction element of the automatic transmission to be engaged, to thereby decrease the rotational speed of an input shaft of the automatic transmission down to a first synchronous rotational speed; and in said power-off downshift control, said control apparatus operates said second hydraulically-operated friction element to be disengaged, and operates said first hydraulically-operated friction element to be engaged, to thereby increase the rotational speed of the input shaft up to a second synchronous rotational speed.

\* \* \* \* \*